May 5, 1953 R. B. COLT 2,637,296
ILLUMINATED INDICATING APPARATUS
Filed June 13, 1950 2 SHEETS—SHEET 1

INVENTOR.
RUTGER B. COLT
BY Robert F. Peck
ATTORNEY

May 5, 1953 R. B. COLT 2,637,296
ILLUMINATED INDICATING APPARATUS
Filed June 13, 1950 2 SHEETS—SHEET 2
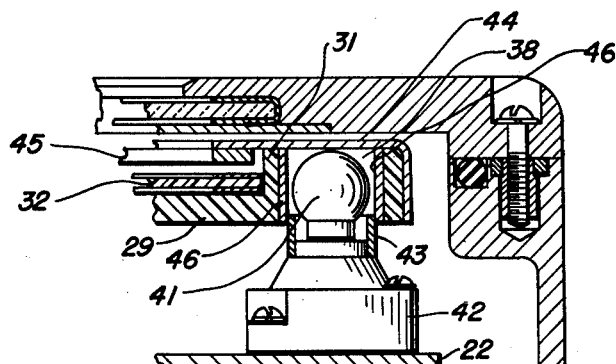
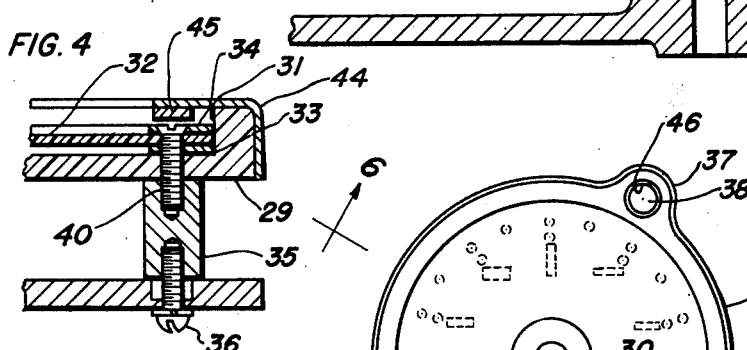
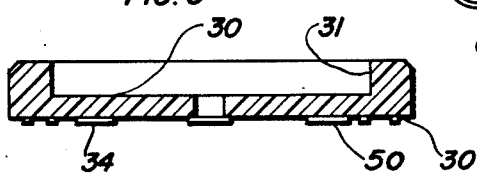
INVENTOR.
RUTGER B. COLT
BY Robert F. Peek
ATTORNEY Patented May 5, 1953

2,637,296

UNITED STATES PATENT OFFICE 2,637,296

ILLUMINATED INDICATING APPARATUS

Rutger B. Colt, Baltimore, Md., assignor to Bendix Aviation Corporation, Baltimore, Md., a corporation of Delaware Application June 13, 1950, Serial No. 167,845

7 Claims. (Cl. 116—129)

This invention relates to novel improvements in means for illuminating indicating instruments wherein substantially improved optical properties result, manufacturing and assembly techniques are simplified, and greater accessibility for service and maintenance is provided.

In the development of illuminated indicating instruments, particularly of the type suitable for military use, great emphasis has been placed on providing sufficient illumination for observation purposes and at the same time eliminating any stray illumination that would hamper reading the instrument or would render ineffective the use of an instrument under "black-out" conditions.

The use of edge-illuminated indicating dials has more or less overcome the basic problem but devices heretofore used have been generally too complicated for mass manufacture at low costs and have been deficient by reason of inadequate optical properties and because of the difficulties encountered during service and maintenance operations.

Accordingly, it is an object of the invention to provide an improved illuminated indicating instrument possessing design characteristics superior to those heretofore used wherein superior optical properties result, manufacture at low cost is enhanced and accessibility for service and maintenance is substantially improved.

The above recited advantages result from the use of a novel light-diffusing assembly comprising a light-diffusing member made of a light transmitting material in combination with a light-shield. The light-diffusing member is recessed in its outer surface to provide the seat for an indicating dial and the light-shield overlays the outer surface and side edge of the light-diffusing member and also a portion of the dial. Suitable apertures are provided in the light-diffusing member to receive light bulbs and the light from the bulbs is confined within the light-diffusing member by means of the opaque light-shield. Suitable reflecting areas on the inner surface of the light-diffusing member cause light from the bulb to be reflected through translucent indicia in the dial and thus illuminate the indicia. The shield and diffuser co-operate to direct a pencil beam of light across the surface of the dial to illuminate the pointer. The shield is held in place by means of springs compressed by the action of the indicator cover and is readily removable for replacement of defective light bulbs.

The invention will be more clearly understood by reference to the detailed description below, when taken in conjunction with the drawings annexed hereto, in which—

Figure 3 is an enlarged partial section, in elevation, taken along the lines 3—3 in Figure 1.

Figure 4 is an enlarged partial sectional view, in elevation, showing the manner in which the diffuser and its associated parts are mounted in the casing. This view is taken along lines 4—4 of Figure 1, with the cover and casing not shown.

Figure 5 is a plan view of the light-diffusing member, the light reflecting areas being represented by dotted lines.

Figure 6 is a sectional view of the light-diffusing member taken along the lines 6—6 of Figure 5.

Figure 1:
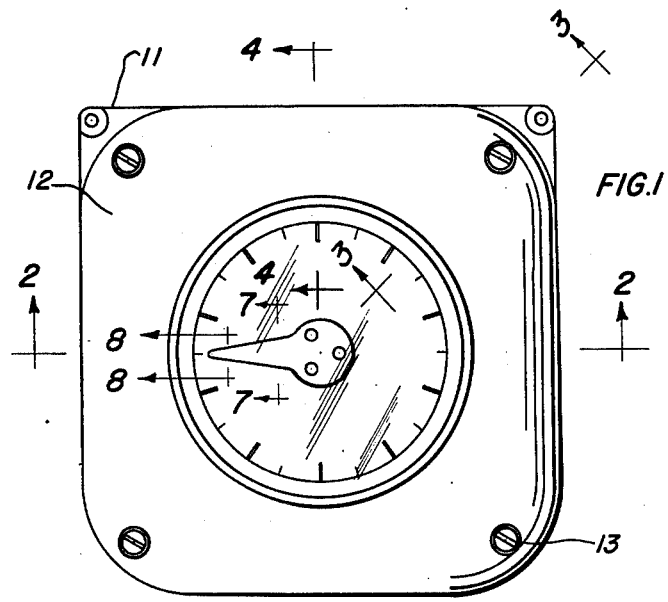
Figure 1 is a plan view of an illuminated indicating instrument made in accordance with the subject invention, showing the casing, dial, pointer, and cover.

Figures 7 and 8 are sectional views of the indicator pointer taken along lines 7—7 and 8—8 in Figure 1.

Figure 2:
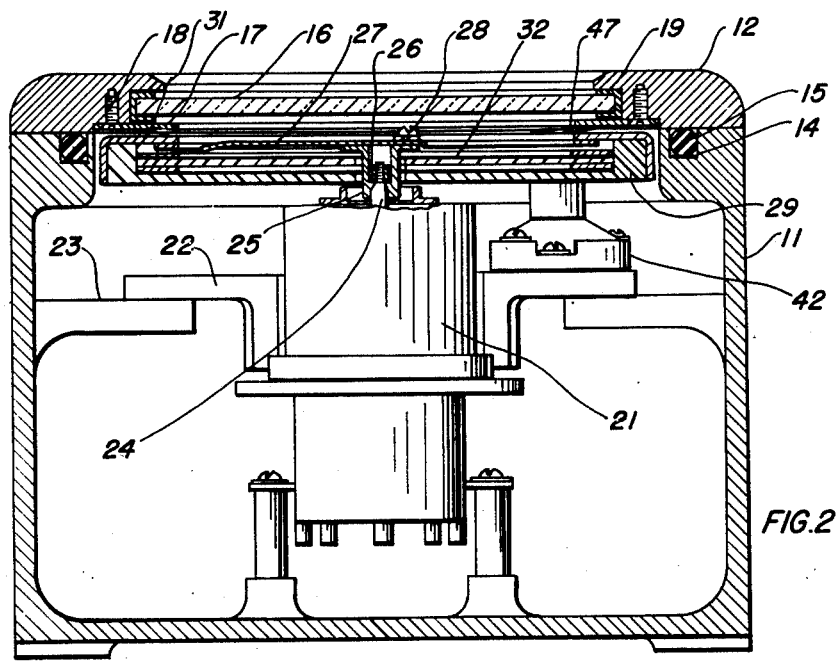
Figure 2 is an enlarged sectional view, in elevation, taken along the lines 2—2 in Figure 1.

Referring first to Figures 1 and 2, we see an indicating instrument having a casing 11 and a cover 12 removably secured to casing 11 by means of a plurality of screws 13. The casing 11 is provided with a suitable groove 14 for receiving therein an "O-ring" 15, the purpose of which is to seal the assembly against moisture leaking into the interior of casing 11. Cover 12 has a window 16 suitably affixed thereto by means of clamping ring 17 and co-operating screws 18. A gasket 19 is provided around the periphery of window 16 to seal the enclosure against penetration of moisture.

The indicating instrument is positioned within casing 11 and may be of the type utilizing a self synchronous motor to drive a pointer, which in turn will co-operate with a suitable scale to give an indication of the condition under observation. Thus, we see the self synchronous motor assembly 21 within the casing 11 suitably mounted and supported by means of table 22 resting on cantilever projection 23. The motor, table, and cantilever projection are all rigidly secured together and to casing 11 and, for the sake of brevity, the structure permitting this rigidity of assembly is not shown, as same is not part of the subject invention. The self synchronous motor has a drive shaft 24 to which is rigidly secured a hub 25, held in place by means of nut 26. The hub 25 has a flanged outer portion to which is affixed a pointer 27 by means of a plurality of screws 28. Surrounding the hub 26 there is an annular light-diffusing member 29 which may be made of any conventional light transmitting material, such as the common acrylic resins now commercially available, viz, methyl methacrylate resin.

The light-diffusion member 29, which for convenience throughout the remainder of the specification will be referred to as a diffuser, has an annular recess 31 in its outer surface for receiving therein an indicating dial 32. The dial 32 and diffuser 29 are rigidly secured together and to the casing 11, the manner of assembly being shown clearly in Figure 4. Thus, referring to Figure 4, we see that dial 32 rests on a mounting ring 33 which in turn abuts the outer surface of the recess 31 provided in diffuser 29. An opaque ring 34 overlays the outer surface of dial 32. A plurality of spacer members 35 are rigidly secured to table 22 by means of a plurality of screws 36. The diffuser 29 and associated parts rests on the upper extremity of spacer 35. The opaque ring 34, the dial 32, the mounting ring 33 and the diffuser 29 are rigidly secured together by means of a plurality of screws 40, and the screws 40 threadably engage the upper extremity of spacers 35 to maintain the diffuser and its associated parts in place.

From the above, it will be seen that any motion transmitted to the pointer 27 will cause same to rotate with respect to dial 32 and obviously, if suitable indicia are provided on the dial 32, the assembly will function as an indicator. Normally, the dial 32 is opaque except for the indicia, which in this instance are translucent to permit light to pass from within the casing outwardly through the indicia through the window in the instrument cover whereby the indicia are illuminated for observation.

The manner of illumination of the indicia and the pointer forms one of the features of the subject invention and will best be understood by reference to Figures 3, 5 and 6. Referring first to Figure 5, we see a plan view of diffuser 29 which shows that this member is annular except for the diametrically disposed ears 37. The ears 37 are provided with suitable apertures 38 and the entire inner surface 30 of the diffuser 29 may be polished. On this polished surface there are reflecting areas, shown by the dotted lines in Figure 6. These areas 50 may be suitable white reflective paint or the like or instead of painted, the polished inner surface may be roughened at these spots. In either case, the effect is to divert light rays toward the top of the diffuser. By using relatively small reflective areas near the light bulbs and progressively larger areas as the distance from the light bulb increases, uniform lighting is provided for all indicia, i. e. uniform intensity thereby eliminating any bright spots or dark spots.

Referring now to Figure 3, we see that the apertures 38 are provided for receiving therein a light bulb 41. This bulb is of any conventional type suitable for socket mounting, the socket 42 being shown generally and being affixed to table 22. Surrounding the bottom of the bulb 41 and cooperating with the diffuser 29, there is an opaque member 43 which serves to confine all of the light from the bulb 41 within the interior of apertures 38. A light-shield 44 is provided to cover the outer surface and side edge of the diffuser 29. This light-shield is made of any suitable opaque material such as metal and has its inner periphery overlaying a portion of the dial 32. Suitably affixed to the under surface of the light-shield 44 at its inner periphery, by means of soldering or brazing, there is an opaque ring 45. Although shown as a two piece assembly, the ring 45 and shield 44 could be integral. Aperture 38 may be provided with a colored sleeve 46 so that the illumination of the instrument can be had in any desired color. In this case a red filter is shown.

From the above, it will be seen that all of the light emanating from the bulb 41 is confined within the aperture 38 provided in diffuser 29 and is directed into the diffuser. Nearly all of the light passing along the bottom section of diffuser 29 will be diverted by the reflecting areas 39 and projected outwardly through the translucent indicia provided in dial 32. Thus, the markings on the dial will be clearly visible by reason of this reflected light.

To illuminate the pointer whereby its position may be readily perceived by an observer, it is to be noted that a certain amount of the light emanating from bulb 41 will pass out of the diffuser 29 from the side wall of the recess 31. However, the light shield 44 and its co-operating ring 45 together with opaque member 34 will confine the light emanating to a substantially pencil beam of light parallel to the surface of the dial. As shown in Figures 7 and 8, the sloping sides 48 of the pointer cause the light to be diverted 90° in its course and pass outwardly of the indicator. Thus, none of the light for illuminating the pointer will interfere with the observation of the instrument because of possible glare or reflection and, of course, the light so directed across the face of the dial will be insufficient to add any appreciable amount of glow to the instrument.

From the above, it will be seen that a minimum amount of light is permitted to pass out of the instrument, thereby rendering the instrument highly suitable for use under "black-out" conditions. Also, the light is directed for maximum ease of observation, that is, observation without interference from reflected or refracted light. Further, the illumination is uniform for all indicia regardless of position.

It is to be noted that the light-shield 44 is not permanently secured to diffuser 29 but merely rests thereon. When the instrument is assembled and in use with the cover 12 in place, the light-shield 44 is held rigidly in place by means of a plurality of leaf springs 47, affixed to cover 12, one of which is shown in Figure 1. The purpose of this arrangement is to permit maximum ease in servicing the instrument for defective light bulbs. With the arrangement described, it is only necessary to remove the cover 12 which then allows the light-shield 44 to be quickly removed, merely by grasping and lifting same, after which the light bulb 41 is readily accessible for inspection and replacement, if necessary. By and large the only servicing required for an instrument of this type is the replacement of light bulbs. With the arrangement described, this servicing is highly simplified.

Another feature of the invention resides in the fact that the light bulb 41 is wholly confined within the diffuser 29. This permits distribution of the light around the diffuser from the light bulb in nearly all directions, thereby securing maximum optical transfer. Furthermore, with the arrangement shown, interchangeable sleeves 46 of different colors can be provided for whatever color illumination is desired.

The light-diffusing assembly, comprising the diffuser 29 and light-shield 44, can be used in any desired application for indicating values of different conditions merely by the selection of the proper dial and by the proper use of reflecting areas on the under side of diffuser 29.

What is claimed and desired to be secured by United States Letters Patent is:

1. In an indicating instrument having a series of light transmitting indicia arranged on an opaque indicating dial and having a co-operating indicating pointer, a light-diffusing assembly for directing light from a source within said instrument through said indicia and across the surface of said dial, comprising: an annular member made of light transmitting material and having a centrally located recess for receiving said dial in nesting relationship, said member having a plurality of symmetrically arranged apertures located in the portion surrounding said recess for receiving light bulbs therein and said member having a series of light reflecting areas on its inner surface corresponding to said series of indicia; and a light-shield having a cut-out central area removably positioned on said member in nesting relationship, said light-shield having its inner periphery overlaying the peripheral edge of said dial and the portion of said member surrounding said dial and its outer periphery turned down to overlay the peripheral edge of said member, said shield co-operating with said member to confine the light from said bulbs within said member and to direct a portion of the light across the face of said dial and over said pointer.

2. In an indicating instrument: a casing; a source of light within said casing comprising a plurality of light bulbs; an annular light-diffusing member in said casing having an annular centrally located recess in its outer surface, said light-diffusing member having a plurality of apertures corresponding to the number of light bulbs symmetrically arranged about its periphery; a light bulb positioned in each of said apertures whereby substantially all of the light emitted from said bulbs passes directly into said diffuser; an annular indicating dial mounted in said recess, said dial being opaque except for a series of light transmitting indicia therein, said light diffusing member having a series of light reflecting areas on its inner surface corresponding to said dial indicia; an indicating element co-operating with said dial indicia to give an indication of a condition under observation; and a light-shield overlaying a portion of the outer surface of said light-diffusing element comprising an annular opaque ring having its inner periphery overlying a portion of said recess and its outer periphery turned down to overlay the entire edge of said light-diffusing member.

3. In an indicating instrument, a casing; a source of light within said casing comprising a plurality of light bulbs; an annular light-diffusing member in said casing having an annular centrally located recess in its outer surface, said light-diffusing member having a plurality of ears corresponding to the number of light bulbs symmetrically arranged about its periphery, said ears having apertures for receiving a light bulb therein; an annular indicating dial mounted in said recess, said dial being opaque except for a series of light transmitting indicia therein, said light-diffusing member having a series of light reflecting areas on its inner surface corresponding to said dial indicia to give an indication of a condition under observation; and a light-shield overlaying a portion of the outer surface of said light-diffusing element comprising an annular opaque ring having its inner periphery overlaying a portion of said recess and its outer periphery turned down to overlay the entire edge of said light-diffusing member.

4. The combination defined in claim 3 wherein said light-shield has its inner periphery extending down in close proximity to the outer surface of said dial whereby any light emitted from that portion of the light-diffuser between the light-shield and the dial is confined to a substantially pencil beam of light parallel to the outer surface of the dial.

5. The combination defined in claim 4 wherein means are provided to removably retain said light-shield in place on said light-diffuser.

6. The combination defined in claim 5 wherein said casing is provided with a removable cover having a transparent portion in juxtaposition to said dial and said retaining means for said light-shield comprise a plurality of resilient members having their extremities in contact with the inner surface of said cover and the outer surface of said light-shield.

7. The combination defined in claim 6 wherein transparent colored sleeves are affixed to the light-diffusing member in said apertures in said ears between said light bulbs and said light-diffusing member.

RUTGER B. COLT.

References Cited in the file of this patent

UNITED STATES PATENTS

| Number | Name | Date |
|---|---|---|
| 1,994,950 | Hoffritz | Mar. 19, 1935 |
| 2,278,520 | Klein | Apr. 7, 1942 |
| 2,317,182 | Dickson | Apr. 20, 1943 |